June 1, 1926.
C. W. METZGAR
1,586,635
VALVE OPENER
Filed Dec. 8, 1925
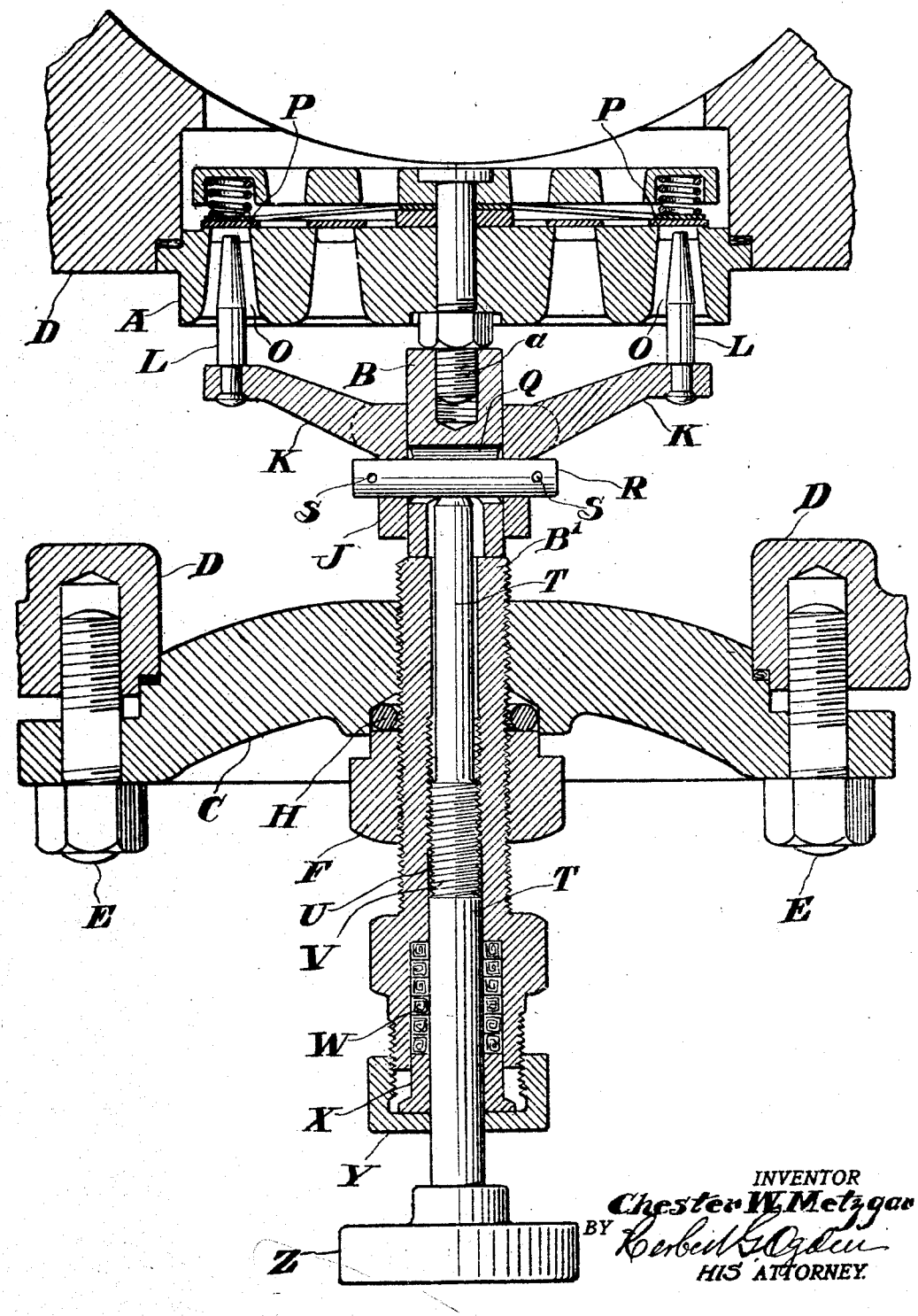
INVENTOR
Chester W. Metzgar
BY Herbert G. Ogden
HIS ATTORNEY Patented June 1, 1926.

1,586,635

UNITED STATES PATENT OFFICE.

CHESTER W. METZGAR, OF EASTON, PENNSYLVANIA, ASSIGNOR TO INGERSOLL-RAND COMPANY, OF JERSEY CITY, NEW JERSEY, A CORPORATION OF NEW JERSEY.

VALVE OPENER.

Application filed December 8, 1925. Serial No. 74,033.

This invention relates to air compressors, but more particularly to means for manually controlling inlet plate valves on said compressors for loading and unloading purposes. In ammonia compressors, and in high pressure stages of two-stage air compressors it is important that in applying valve opening devices to the inlet valves there be no leakage to atmosphere between the valve stems and the cylinder jackets. My invention aims to provide a valve opening device in which provision is made for adequate packing wherever necessary in order to establish air-tight connections between the handle of the valve stem and the inside of the compressor jacket. At the same time my invention aims to provide a valve opener which can be easily manipulated and applied on account of its simplicity, and which at the same time will serve to hold the plate valve assembly firmly in place.

My invention is fully described in the accompanying specification and illustrated in the drawings, in which—

The figure is a central longitudinal sectional view of the valve opener as applied to an inlet valve, showing the inlet valve and so much of the cylinder casing as is necessary.

Referring to the drawing, an inlet plate valve assembly A is shown held in place by means of a guide plug B fitting over and bearing upon the valve bolt a and a set screw B', threaded through a valve cover plate C which is suitably clamped to the cylinder D by the bolts E. A lock nut F in threaded engagement with the set screw B' serves to hold the latter firmly against the plate valve assembly A while leakage is effectively prevented by a suitable packing H such as a tin gasket placed in a recess in the cover plate C beneath the lock nut F. The guide B has a uniform outside diameter at the valve end thereof and a cage J is adapted to reciprocate slidably thereon. Arms K radiate from this cage J and from their ends, fingers L extend at right angles through the ports O of the valve C and contact when desired with the valve disc P to hold it off its seat. The guide B and set screw B' are bored longitudinally but at a suitable point near the plate valve assembly A an opening Q is cut in the guide B at right angles thereto. A bar R is adapted to fit loosely within the opening Q, the diameter of the bar being about three fourths the diameter of the opening as shown in the drawing. Holes of the same diameter as the bar are also drilled in the cage J opposite to each other to receive the bar R. The guide B, the cage J and the bar R are then assembled as shown in the drawing with the ends of the bar R held firmly within the holes in the cage J by means of cotter pins S. A valve stem T is adapted to fit longitudinally through the set screw B' and guide B and to contact at right angles with the bar R. The inside of the set screw B' is threaded at U to engage the threads V on the valve stem. Suitable packing W is provided between the valve stem T and the bore of the set screw B' and is held in position by the gland X and the cap nut Y. A suitable hand wheel Z is attached to the end of the valve stem T for turning the valve stem T to actuate the device.

The operation of my device is such that if it be desired to hold the inlet valve P open and thereby prevent compression of air in the cylinder D the hand wheel Z can be turned causing the valve stem T to bear upon the bar R, which being held rigidly in the cage J will force the cage J toward the valve P and thereby bring the fingers L into contact with the valve disc P and hold the latter open. When the receiver pressure has fallen below the pressure required or when for any other reason it is desired to permit the plate valve to function normally the hand wheel Z may be turned in the opposite direction whereupon pressure on the fingers L will be released and the plate valve P will be allowed to function.

I am not to be understood as confining my invention to the device as described in the specification and shown in the drawings, as different variations may be made by one skilled in the art in order to meet different conditions. As shown in the drawings my device is applied to an inlet valve set in the bottom of a compressor cylinder and consequently there is no need of spring means to return the valve opening device or cage J to its open position as it will fall back by force of gravity when pressure is released. What I claim, however, are the different elements of novelty as described, which in combination provide a simple means of seating a plate valve assembly with a means for manually opening and closing it for loading and unloading purposes.

I claim:

1. A manually operated device for opening and closing plate valves in the unloading of compressors, comprising a plate valve, a guide and a set screw adapted to bear upon the valve, a valve cover adapted to hold the said guide in position, a cylindrical bore in the said guide, a valve stem adapted to fit within the guide and to have threaded engagement with the set screw, a valve lifting device adapted to fit slidably upon the said guide, and means for making the said valve lifting device responsive to downward pressure from the said valve stem.

2. A manually operated device for opening and closing plate valves in the unloading of compressors, comprising a plate valve assembly, a guide and a set screw adapted to bear upon the said valve assembly, a valve cover adapted to hold the said set screw in position, a cylindrical bore in the said guide, a valve stem adapted to fit within the said bore in the said guide and to have threaded engagement with the set screw, a valve lifting device adapted to fit slidably upon the guide, and means for establishing connection between the end of the said valve stem and the said valve lifter, including a bar at right angles to and in contact with the said valve stem and with the said valve lifter.

3. A manually operated device for opening and closing plate valves in the unloading of compressors comprising a guide and a set screw adapted to bear upon the valve, a valve cover adapted to hold the guide in position, a cylindrical bore in the said guide, a valve stem adapted to fit within the said bore in the said guide and to have threaded engagement with the set screw, a manually operable wheel on the end of said stem, a valve lifting device adapted to fit slidably upon the said guide, openings in the walls of said guide, a rod extending loosely through said openings and held integrally at both ends by the valve lifting device, and adapted to contact with the end of said valve stem whereby downward pressure of said valve stem will be communicated to the said valve lifting device.

In testimony whereof I have signed this specification.

CHESTER W. METZGAR.